United States Patent Office 3,403,879
Patented Oct. 1, 1968

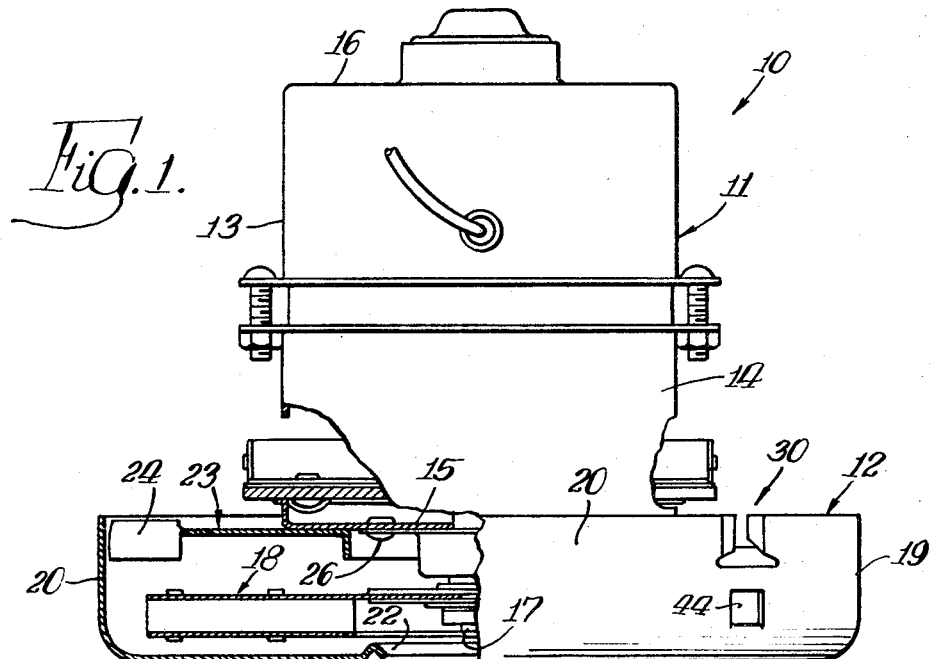

3,403,879
FAN HOUSING ATTACHING MEANS
Arthur C. Hollatz, Bloomington, Ill., assignor to National Union Electric Corporation, a corporation of Delaware
Filed June 16, 1966, Ser. No. 558,038
11 Claims. (Cl. 248—223)

ABSTRACT OF THE DISCLOSURE

Apparatus for securing a cup-shaped fan housing to a stator plate secured to the motor portion of a motor-fan unit. Displacement of a circumferentially extending bendable tap on the side wall of the fan housing over a reaction surface on the stator plate effects a positive, rigid connection of the fan housing to the stator plate. One edge of the tap is inclined with respect to the plane of the reaction surface on the stator plate so as to provide a cam action tending to clamp the housing to the stator plate when the tab is displaced over the reaction surface. A pocket on the side wall of the fan housing functions as a stop to limit telescoping movement of the fan housing toward the stator plate and to position the inclined edge of the tab with respect to the reaction surface on the stator plate.

---

This invention relates generally to an attaching means for securing one member to another member and more particularly relates to an attaching means for securing a fan housing to the motor portion of a motor-fan unit.

Many vacuum cleaners and other air displacing devices presently in use employ a consolidated construction for the motor and fan portions of the device, commonly referred to as a motor-fan unit. In such a unit, the motor portion usually includes an electric motor enclosed in a housing through which one end of the motor shaft extends. The fan portion usually includes a rotatable fan assembly secured to the projecting end of the motor shaft, and a housing encloses the fan assembly and is secured to the motor housing. The fan housing may be directly secured to the motor housing, or may be indirectly secured through an intermediate member such as a stator plate.

Regardless of the directness or indirectness of the securement, a substantial amount of time may be required for assembly due to the provision of interconnecting brackets and their associated fasteners. Such brackets and fasteners oftentimes obstruct the interior of the fan housing so that a smaller than optimum diameter fan assembly must be used in order to avoid contact with such structure. Moreover, the use of brackets and fasteners to secure the fan portion to the motor portion of a motor-fan unit increases the overall cost of the unit. The attaching means to be hereinafter described overcomes the foregoing objections and provides additional advantages over the constructions heretofore proposed.

Accordingly, it is a general object of the present invention to provide a novel and improved attaching means for securing one member to another member.

A more particular object is to provide a novel and improved attaching means for securing a fan housing to a support member, such as a stator plate.

Still another object is to provide a novel and improved attaching means of the foregoing character, which leaves the interior of the fan housing substantially unobstructed.

A further object is to provide a novel and improved attaching means for securing a fan housing or the like to a support member, which corrects minor misalignments between the housing and support member during assembly.

A still further object is to provide a novel attaching means of the character described, which is simple in construction, reliable in operation and economical to manufacture.

Other objects and advantages of the invention will become apparent from the following detailed description and accompanying sheet of drawings, in which:

FIG. 1 is a side elevational view, with a portion broken away to show internal structural details, of a motor-fan unit employing an attaching means for securing the fan housing of the unit to a stator plate rigid with the motor portion of the unit;

FIG. 2 is an exploded side elevational view of the fan portion of the motor-fan unit of FIG. 1, and showing the relationship of the parts of the attaching means before assembly;

FIG. 3 is a somewhat enlarged, fragmentary, side elevational view of a portion of the motor-fan unit of FIG. 1 and showing the position of the parts of the attaching means after assembly;

FIG. 4 is a sectional view taken along the line 4—4 of FIG. 3; and

FIG. 5 is a top view of the attaching means shown in FIG. 3.

Briefly described, the present invention contemplates, in its broader aspects, a novel and improved attaching means for securing one member to another member. In the specific application to be hereinafter described, the present invention contemplates a novel and improved attaching means for securing a fan housing having a cylindrical side wall to a transversely extending support member such as a stator plate secured to the motor portion of a motor-fan unit. According to the invention, one of the members, such as the stator plate, is provided with a reaction surface and the other member, such as the fan housing side wall, is provided with at least one partially severed portion or tab having a free end and an edge inclined with respect to the reaction surface of the stator plate when the members are engaged. Displacement of the tab over the reaction surface causes the inclined edge to engage the reaction surface on the stator plate and exert a cam action thereagainst tending to clamp the housing to the stator plate.

In order to limit telescoping movement of the fan housing toward the stator plate and to position the inclined edge of the tab adjacent the reaction surface, stop means is provided. Such stop means preferably comprises means defining at least one pocket on the fan housing, such pocket including a shoulder for engaging a portion of the stator plate. In the specific construction of the attaching means to be hereinafter described, the stop means comprises a displaced portion of the material of the fan housing side wall for engaging an abutment on the stator plate formed by a depending portion thereof.

In FIG. 1, a motor-fan unit 10 such as is used in canister and stick-type vacuum cleaners, as well as other air displacing devices, is illustrated. The motor-fan unit 10 generally comprises a motor portion 11 and a fan portion 12. The motor portion 11 includes an electric motor (not shown) enclosed in a two-piece housing 13 having a cylindrical side wall 14 and spaced end walls 15 and 16. A portion 17 of the motor shaft extends through the end wall 15 of the motor housing 13.

The fan portion 12 includes a centrifugal fan assembly 18 secured to the portion 17 of the motor shaft, and a cup-shaped fan housing 19 encloses the fan assembly 18. The housing 19 has a cylindrical side wall 20 and an end wall 21, the latter having a central opening 22 therethrough providing an air inlet for the housing 19. The fan portion 12 also includes a stator plate 23 having a plurality of inclined blades or vanes 24 around the periphery thereof for improving the air flow characteristics of the fan assembly 18. In the present instance, the stator plate 23 is secured, as by rivets 26, to the lower end wall 15 of the motor housing 13, but could be secured to the motor portion 11 by other means. When the fan portion 12 is assembled, the stator plate 23 spans the open end of the fan housing 19 and extends transversely of the cylindrical side wall 20.

According to the present invention, the fan housing 19 is secured to the stator plate 23 by novel attaching means, indicated generally at 30. Preferably, a plurality of circumferentially spaced attaching means 30 are provided around the periphery of the housing 19. However, since the attaching means are all identical, only one will be described in detail. Thus, as seen in FIGS. 2 to 5, each attaching means 30 preferably comprises means defining a reaction surface 31 on the stator plate 23 and means defining at least one and preferably a pair of partially severed bendable portions or circumferentially extending tabs 32 on the side wall 20.

The reaction surface 31 may be specifically formed on or provided by additional structure secured to the stator plate 23 but, as shown in FIGS. 2 through 5, is defined by a radially extending planar portion of the plate between a pair of the stator blades 24. The stator plate 23 is also preferably provided with an axially extending arm 43 which depends from the periphery of the plate as an extension of the reaction surface 31. The purpose and function of the arm 43 will be described more fully hereinafter.

Each pair of tabs 32 is preferably formed by an inverted, substantially T-shaped slot 36 in the side wall 20 of the fan housing 19. Thus, each tab 32 has a free end 37, an outer circumferentially extending edge 38, and an inner edge 42. In the illustrated embodiment, the edge 38 is coextensive with the end edge, indicated at 39, of the fan housing side wall 20. The inner edge 42 of each tab 32 is inclined with respect to the outer edge 38 so that each tab 32 increases in width from its free end 37.

Assuming that the stator plate 23 has been secured to the end wall 15 of the motor housing 13 and the fan assembly 18 has been secured to the extended portion 17 of the motor shaft, the attaching means 30 may be employed to permanently and rigidly secure the fan housing 19 to the stator plate 23. Thus, the fan housing 19 is initially oriented as shown in FIG. 2 with the gap between the free ends 37 of the tabs 32 in substantial axial alignment with the circumferential center of the reaction surface 31 of the stator plate 23. To facilitate such alignment, the gap may be aligned with a central, radially extending, strengthening groove 41 in the reaction surface 31, if such groove is provided. When so aligned, the housing 19 is shifted axially toward the stator plate 23 so that the housing side wall 20 telescopes around the stator plate and its dependnig arms 43.

In order to assure accurate axial positioning of the inclined lower edges 42 of the tabs 32 with respect to the reaction surface 31 of the stator plate 23 and to limit telescoping movement of the fan housing 19 and stator plate 23, stop means is provided. Such stop means preferably comprises means defining a pocket on the inner surface of the fan housing side wall 20 for engaging a portion of the stator plate. In this instance, the portion of the stator plate that engages the pocket is the lower end, indicated at 44, of the arm 43. The pocket is preferably formed by a displaced or struck-out portion 47 of the material of the housing side wall 20, which defines a radially inwardly extending shoulder 48 on the side wall 20. Stated another way, the shoulder 48 extends perpendicularly to the direction of movement of the housing 19 during assembly thereof with the stator plate 23.

Thus, during initial assembly of the fan portion 12, the arms 43 of the stator plate 23 are circumferentially aligned with their respective pockets on the side wall 20 and the housing is moved toward the stator plate. Such movement continues until the should 48 on the housing side wall 20 engages a recessed inner edge 54 at the end 44 of each arm 43.

During and after assembly it is desirable to maintain the interior of the housing 19 substantially unobstructed, that is, free of brackets or fasteners, so that the outer periphery of the fan assembly 18 may be disposed closely adjacent the inner surface of the housing side wall 20. Consequenlly, the size of the fan assembly 18 and/or fan housing 19 need not be compromised because of the presence of brackets or fasteners in the interior of the housing 19. To this end, the arms 43 are preferably rectangularly shaped and arcuately contoured so as to engage the inner surface of the housing side wall 20 in surface-to-surface relation when the inner edges 54 of the arms 43 are fully seated in their pockets. In addition, the space between the displaced portion 47 of each pocket and the adjacent inner surface of the housing side wall 20 is substantially equal to the thickness of the arms 43 so as to assure the aforementioned surface-to-surface relationship.

In order to correct for minor misalignments between the fan housing 19 and the stator plate 23 during initial assembly and to eliminate any possibility of relative rotational movement of the parts after assembly, the end 44 of each arm 43 is recessed or notched to permit portions of the arm to extend past the shoulder 48 of the stop means. The side edges, indicated at 55, of the recess preferably diverge from the inner edge 54 so as to define inclined cam surfaces or guide means for guiding the shoulder 48 against the inner edge 54 of the recess as the housing 19 moves toward its fully engaged position with the stator plate 23. Thus, minor circumferential misalignment is corrected as the parts are forced together.

When the inner edge 54 of the recess, which comprises an abutment, engages the shoulder 48 of the pocket or stop means, the laterally spaced side edges 55 of the recess prevent relative rotational movement between the fan housing 19 and the stator plate 23.

While the side wall 20 of the housing 19 is preferably provided with pockets for receiving the ends 44 of the arms 43 when the housing 19 is fully engaged with the stator plate 23, such pockets could be eliminated and the arms 43 could be made longer so that the remote lower ends thereof, indicated at 56, would engage the corner junction between the housing side wall 20 and end wall 21.

Assuming the housing 19 has been fully engaged with the stator plate 23 and the shoulder 48 of each pocket has seated against the inner edge 54 of the recess of its associated arm 43, the housing 19 may be securely clamped in such position by displacing or bending the tabs 32 inwardly over the adjacent reaction surface 31 on the stator plate 23. Because the free ends 37 of the tabs are disposed toward each other, both tabs 32 may be concurrently displaced or bent by an appropriate tool. Such displacement causes the inclined lower edges 42 of the tabs 32 to engage their associated reaction surface 31 and exert a cam action to clamp the housing to the stator plate. Such cam action results in a slight tilting of the tabs 32 and an axial displacement of the free ends 37 thereof as the inclined edges 42 move inwardly across the reaction surface 31. In addition, the aforementioned cam action also causes the inclined lower edges 42 of the tabs to dig into the material of the reaction surface 31, thereby preventing the tabs 32 from loosening, even after long periods of operation of the unit 10.

It will thus be apparent from the foregoing description that the attaching means of the present invention provides a novel and improved construction for securing a fan housing to the motor portion of a motor-fan unit. Such construction assures a rigid and lasting connection between the parts, facilitates assembly, and is economical in cost.

I claim:

1. Attaching means for rigidly securing one member to another member, said attaching means comprising: a reaction surface on one of said members; at least one bendable portion on the other of said members and having a free end and an inclined edge; and stop means carried by and coacting with said members for positioning said members so that the inclined edge of said bendable portion is disposed adjacent said reaction surface, the free end of said bendable portion being displaced over said reaction surface to cause the inclined edge of said bendable portion to nonyieldably engage said reaction surface and clamp said members together; said reaction surface, said bendable portion and said stop means coacting to hold said members in rigidly interconnected relation.

2. The attaching means of claim 1, further characterized in that a pair of said bendable portions are provided on said other member and having their free ends disposed adjacent to each other, and the inclined edges of both of said portions are concurrently moved into engagement with said reaction surface upon concurrent displacement of the free ends of said portions over said surface.

3. The attaching means of claim 2, further characterized in that said other member has an end edge disposed toward said one member, and said portions are defined by an inverted substantially T-shaped slot in said other member extending inwardly from said end edge.

4. The attaching means of claim 1, further characterized in that said stop means comprises means defining a pocket on said other member for receiving a portion of said one member, and said portion of said one member includes a guide means coacting with said pocket for aligning said bendable portion with said reaction surface upon movement of said members toward each other.

5. The attaching means of claim 1, further characterized in that said stop means comprises a shoulder on said other member engageable with said one member, and said one member is provided with an abutment having an end edge and a recess in said end edge, said recess having an inner edge engageable with said shoulder and laterally spaced divergent side edges, said divergent side edges providing cam surfaces for guiding said shoulder against the inner edge of said recess as said members are moved toward each other and for preventing relative lateral movement between said members.

6. Attaching means for rigidly securing a cup-shaped fan housing to a support member in telescopic relation, said fan housing having a cylindrical side wall and said support member having a radially extending planar surface portion, said attaching means comprising at least one circumferentially extending bendable tab on said cylindrical side wall having a free end and axially spaced inner and outer edges, the inner one of said edges being inclined, and stop means for limiting telescoping movement of said fan housing and said support member for positioning said members so that the inclined edge of said tab is in substantial axial alignment with said surface portion when said housing and said support member are fully telescoped, said stop means including means for preventing relative circumferential movement between said fan housing and support member when the former and the latter are fully telescoped, said tab being displaced over said planar surface portion to cause the inclined edge of said tab to react against said planar surface portion and exert a cam action clamping said fan housing to said support member in rigidly interconnected relation.

7. The attaching means of claim 6, further characterized in that said support member comprises a circular stator plate adapted to be mounted at one end of a motor housing having a shaft projecting therefrom and a fan secured to said shaft, and said stator plate includes at least one arm extending axially from the periphery thereof, engagement of said arm with said stop means limiting telescoping movement of said fan housing and said stator plate.

8. The attaching means of claim 7, further characterized in that said stop means comprises a shoulder on the side wall of said fan housing.

9. The attaching means of claim 7, further characterized in that said arm is arcuately contoured, and said stop means including means to hold said arm against the inner side of said side wall in surface-to-surface relation, whereby the interior of said fan housing is substantially unobstructed so that the periphery of said fan may be disposed closely adjacent the inner side of said housing side wall.

10. In combination, a generally cup-shaped member having a circumferential side wall and an open end, a transversely extending member fitted in telescopic relation in the open end of said cup-shaped member, abutment means extending axially from the periphery of said transversely extending member and engaged internally with said cup-shaped member for limiting the telescopic fit therebetween, and means on said side wall defining at least one tab portion bent inwardly from said side wall and overlying said transversely extending member, said tab portion having an inclined cam edge engaging said transversely extending member and thereby holding said members in rigidly clamped relation.

11. The combination of claim 10, further characterized in that a circumferentially extending shoulder having end edges is provided on the circumferential side wall of said cup-shaped member, and said abutment means has an end edge having a recess therein, said recess having an inner edge engaging said shoulder and laterally spaced side edges engaging the end edges of said shoulder, whereby relative circumferential movement between said members is prevented.

References Cited

UNITED STATES PATENTS

| | | | |
|---|---|---|---|
| 2,187,336 | 1/1940 | Wallschlaeger | 248—223 |
| 2,388,650 | 11/1945 | Whittell et al. | 248—361 |
| 3,037,730 | 6/1962 | Knoll et al. | 248—224 |
| 3,134,467 | 5/1964 | Blyth | 24—73 |

JOHN PETO, *Primary Examiner.*